United States Patent
Park

(10) Patent No.: US 12,221,027 B2
(45) Date of Patent: Feb. 11, 2025

(54) CAR TRASH CAN

(71) Applicants: Platech Co., Ltd., Gyeonggi-do (KR); Chan Moon Park, Seoul (KR)

(72) Inventor: Chan Moon Park, Seoul (KR)

(73) Assignees: Platech Co., Ltd., Gyeonggi-do (KR); Chan Moon Park, Seoul (KR)

( * ) Notice: Subject to any disclaimer, the term of this patent is extended or adjusted under 35 U.S.C. 154(b) by 164 days.

(21) Appl. No.: 17/961,777

(22) Filed: Oct. 7, 2022

(65) Prior Publication Data
US 2023/0226964 A1    Jul. 20, 2023

(30) Foreign Application Priority Data
Jan. 20, 2022 (KR) .......... 10-2022-0008700
Aug. 19, 2022 (KR) .......... 10-2022-0104242

(51) Int. Cl.
*B60N 3/08* (2006.01)
*B65F 1/02* (2006.01)
*B65F 1/14* (2006.01)
*B65F 1/16* (2006.01)

(52) U.S. Cl.
CPC .......... *B60N 3/08* (2013.01); *B65F 1/02* (2013.01); *B65F 1/141* (2013.01); *B65F 1/1646* (2013.01)

(58) Field of Classification Search
CPC .......... B60N 3/08; B60N 2/90; B60N 2/6009; B65F 1/02; B65F 1/141; B65F 1/1646

USPC .............. 220/521; 297/182, 188.01
See application file for complete search history.

(56) References Cited

U.S. PATENT DOCUMENTS

| 9,868,375 | B1 * | 1/2018 | Kachel | ............ B60N 3/08 |
| 2010/0231010 | A1 * | 9/2010 | Manley | ........ B60N 2/7005 297/182 |
| 2015/0335215 | A1 * | 11/2015 | Terry | ............ A47C 7/00 4/458 |

FOREIGN PATENT DOCUMENTS

| KR | 200247895 Y1 | 10/2001 |
| KR | 20080009468 A | 1/2008 |

* cited by examiner

*Primary Examiner* — Don M Anderson
*Assistant Examiner* — Elizabeth J Volz
(74) *Attorney, Agent, or Firm* — KIRTON McCONKIE; Evan R. Witt

(57) ABSTRACT

A car trash can includes a fitting part fitted into a gap between a front seat and a center console and provided with a recessed part on one side surface or both side surfaces. A mounting bracket protrudes a predetermined length from one side surface of the fitting part and has a plurality of holding parts. A trash storage box has an adjustable mounting height by selectively fixing a holding provided on the rear surface of the trash storage box to one of the plurality of holding parts. An article storage part may be provided on the upper portion of the fitting part. An elastic part may be installed on one or two of the recessed parts to be elastically pressed when inserting the car trash can between a seat and a center console and firmly fit the car trash can between the seat and the center console.

18 Claims, 13 Drawing Sheets

CAR TRASH CAN

TECHNICAL FIELD

The present invention relates to a car trash can and, more particularly, to a multi-purpose car trash can, which can be easily and detachably installed in a gap between a front seat and a center console, is easy to charge a mobile phone and store belongings in addition to trash disposal, and can accommodate a cleaning brush or writing instruments for convenient use.

BACKGROUND OF THE INVENTION

In general, for the convenience of a driver who drives a vehicle for a long time, an armrest with a console box is provided at the rear portion of the center console between the driver's seat and the front passenger seat, so that various items are stored in the console box. In addition, a storage part such as a cup holder is provided in the front part of the center console.

Furthermore, while driving a vehicle, a cell phone is charged in the vehicle by using a cigar jack provided in the vehicle, a USB tab for power supply, or a wireless charger. Recently, a separate cell phone storage part capable of storing a cell phone has also been installed in the vehicle in the front part of the center console.

However, since the space of the console box or cell phone storage part is only large enough to accommodate general items or cell phone, it is difficult to put a sufficient amount of garbage generated while driving in the space of the console box or cell phone storage part.

That is, while driving a vehicle, a large amount of garbage is generated as a driver or passengers eat snacks or fruits inside the vehicle. If there is a plastic bag or the like that can receive such garbage inside the vehicle, the garbage can be stored in the plastic bag for a while. However, if there is no plastic bag or the like, garbage is left in the vehicle, so there is a problem that the seats or floor becomes dirty and polluted with the garbage.

In order to solve the problems, there has been suggested a car trash can in Korean Patent Publication No. 10-2008-0009468 (published, 29 Jan. 2008) as disclosed in patent document 1 of the following prior art documents.

According to the trash can of patent document 1, a hinge-type cover is installed on an open upper surface portion of a case which is formed long downward so as to contain garbage, and a coupling member is provided on one side of the case so as to be coupled to a side surface of the rear of a seat by widening the gap between a fixed arm and a movable arm, so that the case is positioned between the driver's seat and the front passenger seat beside the driver's seat.

In addition, there has been suggested a trash can to be installed inside a vehicle in Korean Reg. Utility Model Publication No. 20-0247895 (published, 26 Oct. 2001) as disclosed in patent document 2 of the following prior art documents.

According to the trash can of patent document 2, the upper part of a plastic bag is sandwiched between a holding cap and a base cap so as to form the shape of a pocket, and a lid is installed on the holding cap that forms an opening part, so that the trash can is mounted on a grill, through which cool or warm air is emitted, by a mounting member provided on the rear.

PRIOR ART DOCUMENTS

Patent Documents

[Patent Document 1] Korean Patent Publication No. 10-2008-0009468 (published, 29 Jan. 2008) "Car Trash Can"
[Patent Document 2] Korean Reg. Utility Model Publication No. 20-0247895 (published, 26 Oct. 2001) "Car Dust Pocket"

DETAILED DESCRIPTION OF THE INVENTION

Technical Problems

According to patent document 1, the trash can is long and completely blocks the gap between the backrests of both the driver's seat and the front passenger seat and thus there are problems with the inconvenience in use and the risk of safety accidents since it is troublesome to exchange items or snacks between people sitting in the front seats and people sitting in the back seats by raising hands upwards rather than passing them through the gap between the backrests of the front seats. In addition, when a person sitting in the driver's or front passenger seat wants to dispose of some garbage, he or she has to turn head back to open or close the cover each time.

According to patent document 2, when using the car dust pocket mounted on a grill, there is a problem that a large plastic bag cannot be used due to the difficulties of operating various switches since the plastic bag covers a vehicle navigation monitor and various switches for operating an audio system, an air conditioning system for cooling or heating and a vehicle navigation system required for vehicle operation. In addition, when a long plastic bag is used to increase the capacity of the garbage to be contained, there is a problem that the plastic bag interferes with the operation of the shift lever, thereby hindering safe driving.

The present invention has been derived to solve the problems of the prior art and has an object to provide a car trash can for easy use by a driver, which is detachably and firmly inserted into a gap between a front seat and a center console without interfering with the leg of a seat occupant.

There is another object of the present invention to provide a multi-purpose car trash can, in which charging of a mobile phone and storage of belongings may be easily carried out, and items such as a cleaning brush or writing instruments can be conveniently stored for use.

There is a further object of the present invention to provide a car trash can, in which the height of a trash storage box can be adjusted up and down and the position of the trash storage box can be adjusted back and forth according to the physical conditions of a seat occupant or the structure of a vehicle, so interference with the leg of a seat occupant can be prevented.

Means of Solving the Problems

According to one aspect of the present invention, the above objects can be achieved by providing a car trash can, including a fitting part, which is fitted into a gap between a front seat and a center console and provided a recessed part on one side surface or both side surfaces, a mounting bracket protruding a predetermined length from one side surface of the fitting part and having a plurality of holding parts provided in the vertical direction, a trash storage box, of which mounting height is adjusted by selectively fixing a holding means that is provided on the rear surface of the trash storage box to one of the plurality of holding parts provided on the mounting bracket.

The car trash can configured as above may further include an elastic means installed on the recessed part, which may be provided on one side surface or both side surfaces of the fitting part, wherein the elastic means is elastically pressed when the fitting part is inserted between the front seat and the center console or is elastically restored to an original position when the fitting part is withdrawn.

In addition, the recessed part may be divided into a plurality of recessed part sections on one side or both sides of the fitting part, one or more of the recessed part sections are provided with the elastic means, and the remaining recessed part sections are provided with compression members that partially protrude so as to be pressed elastically, so that the fitting part fits firmly into the gap between the front seat and the center console.

Herein, it is preferable that the elastic means is formed of a leaf spring with a curved portion, which is formed in the center and protrudes outward, and both ends of the leaf spring that is the elastic means are fitted into release prevention parts formed on the upper and lower portions of the recessed part to be provided with the elastic means, so that the release prevention parts prevent the release of the leaf spring.

Moreover, it is preferable that the elastic means includes a support plate coupled to the lower end of the recessed part by a hinge part, and a coil spring installed between the support plate and the fitting part so as to maintain the upper end of the hinge-coupled support plate in an elastically spread state.

It is preferable that when the support plates constituting the elastic means are respectively installed on both sides of the fitting part, a through-hole having a predetermined size for the insertion of a coil spring is provided in the fitting part, on which the support plates are provided, so that the support plates on the both sides are applied with elasticity by the single coil spring through the through-hole.

According to another aspect of the present invention, the above objects can be achieved by providing a car trash can, in which a self-assembly type upper frame is provided in a trash storage box, an opening part is provided at a side of the upper portion of the upper frame so as to be opened or closed by a hinge-type cover, a storage part is provided at the other side of the upper portion so that a cleaning brush or writing instruments are received through a storage hole, an article storage part is provided in the upper portion of a fitting part so as to store a mobile phone and a charging cable and to charge the mobile phone, and a charging cable hole is formed in the bottom of the article storage part. Therefore, the car trash can be used for multiple purposes.

According to a further aspect of the present invention, the above objects can be achieved by providing a car trash can, in which a mounting bracket includes a holding part formed of holding parts or Velcro parts formed in two or three stages, and a trash storage box includes a holding means formed of a hook or a Velcro part so as to be coupled to one of the holding parts formed in two or three stages, so that the vertical height of the trash storage box can be adjusted. In addition, if a fitting part is provided with a bracket hole in one side and a mounting bracket is provided with a support part that enters or exits through the bracket hole, the trash storage box can be adjusted in position in the back and forth direction according to the physical conditions of a seat occupant or the structure of a vehicle.

Effects of the Invention

The car trash can according to the present invention is easy to be installed and convenient to use since the car trash can is easily detached or attached by means of the mounting bracket of the fitting part which is fitted into the gap between the front seat and the center console and is used for multiple purposes.

In addition, the installation height of the trash storage box in the vertical direction as well as the position of the trash storage box in the front and rear directions can be easily adjusted according to the body conditions of a seat occupant or the structure of a vehicle, thereby providing convenience in use.

Furthermore, the trash storage box may be separated from the mounting bracket so as to be conveniently hung or attached anywhere on the front or rear seat of the vehicle by itself, thereby providing convenience in use.

BRIEF DESCRIPTION OF THE DRAWINGS

FIG. 1A and FIG. 1B are plan views respectively showing a car trash can according to a first embodiment of the present invention, in which FIG. 1A shows a type in which an article storage part is not provided and FIG. 1B shows a type in which an article storage part is provided between a center console and a front seat.

BEST NODE FOR CARRYING OUT THE INVENTION

Figure 1A:
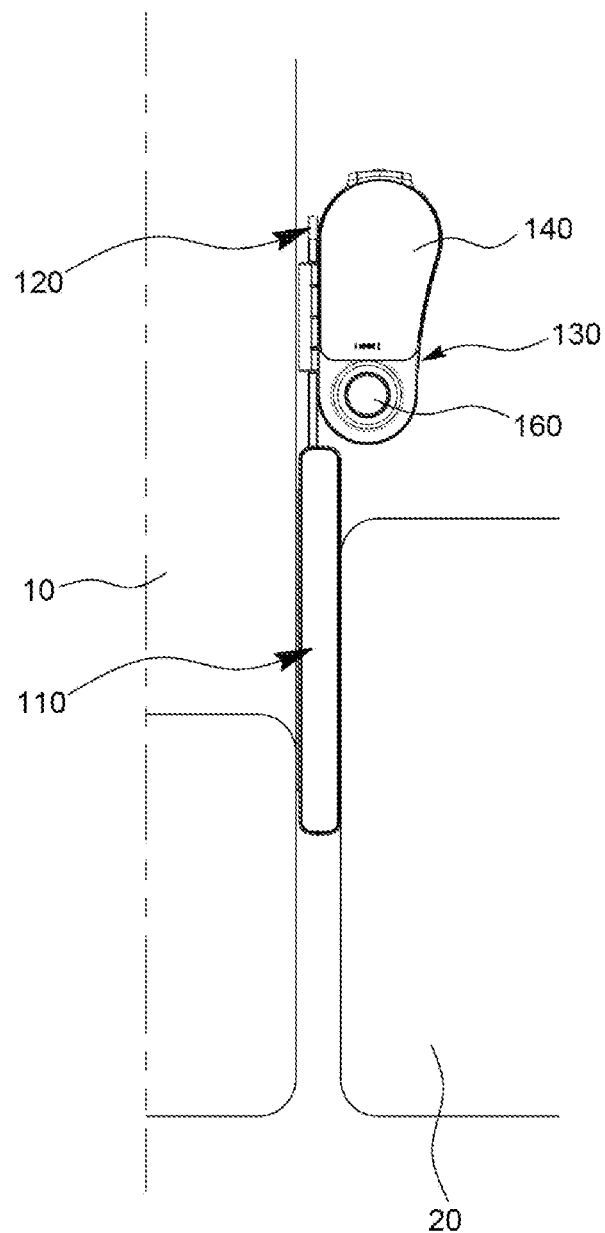

Hereinafter, preferred embodiments of the present invention will be described in detail with reference to the accompanying drawings.

The terms or words used in the present invention described below should not be construed as being limited to conventional or dictionary meanings, but should be interpreted as meanings and concepts consistent with the technical spirit of the present invention based on the principle that the present inventor can appropriately define the concepts of terms in order to describe his invention in the best way.

Therefore, it should be understood that the embodiments described herein and the configurations shown in the drawings are only preferred embodiments of the present invention and do not represent all of the technical spirit of the present invention, so that various equivalents and modifications may be made.

Embodiment 1

Figure 1B:
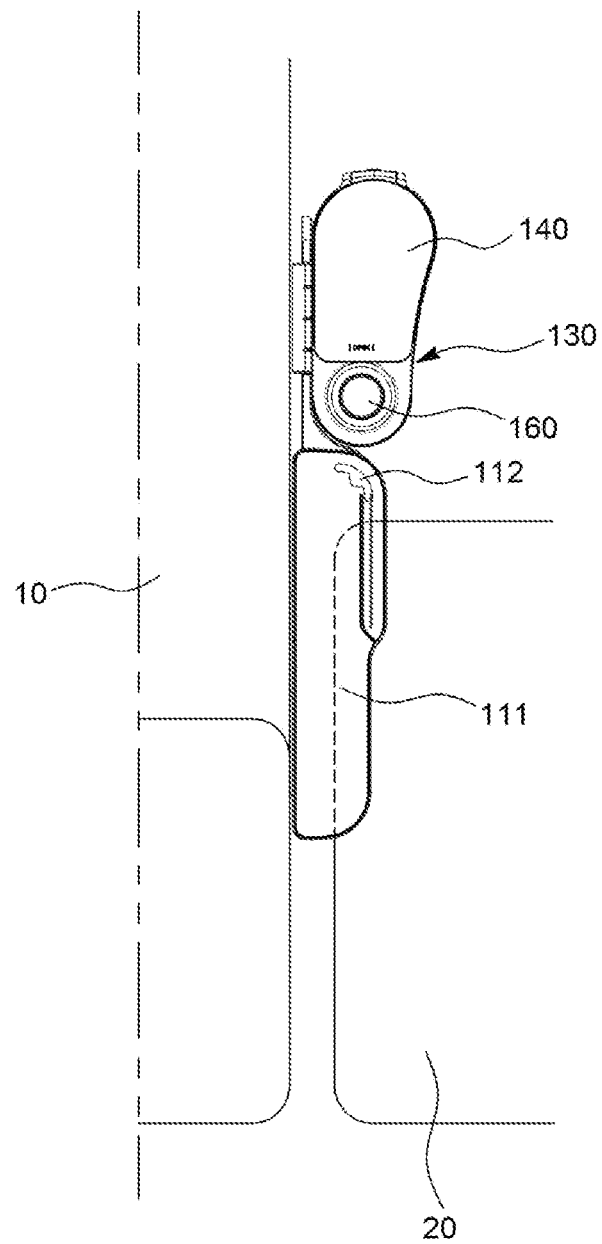
Figure 2A:
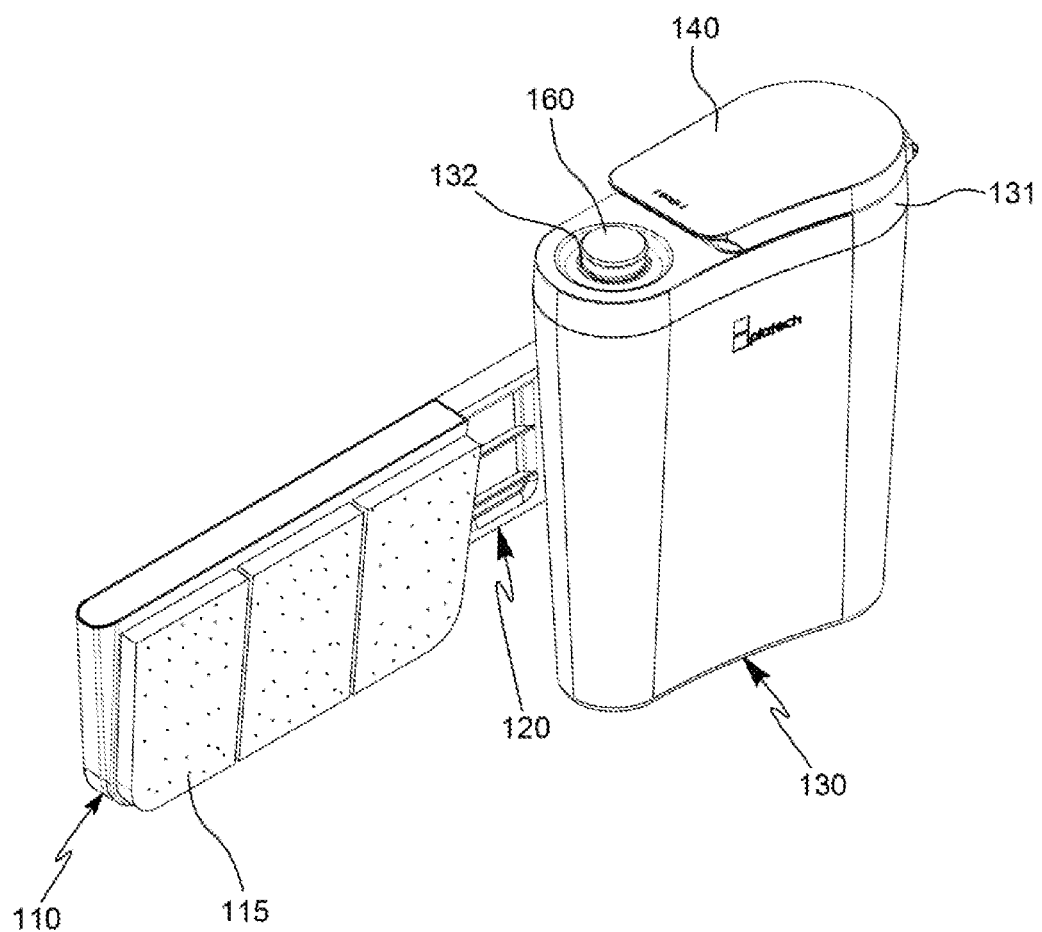
FIG. 2A and FIG. 2B are front perspective views respectively showing the overall structures of the car trash cans of the type without the article storage part and the type with the article storage part according to the first embodiment of the present invention.
Figure 2B:
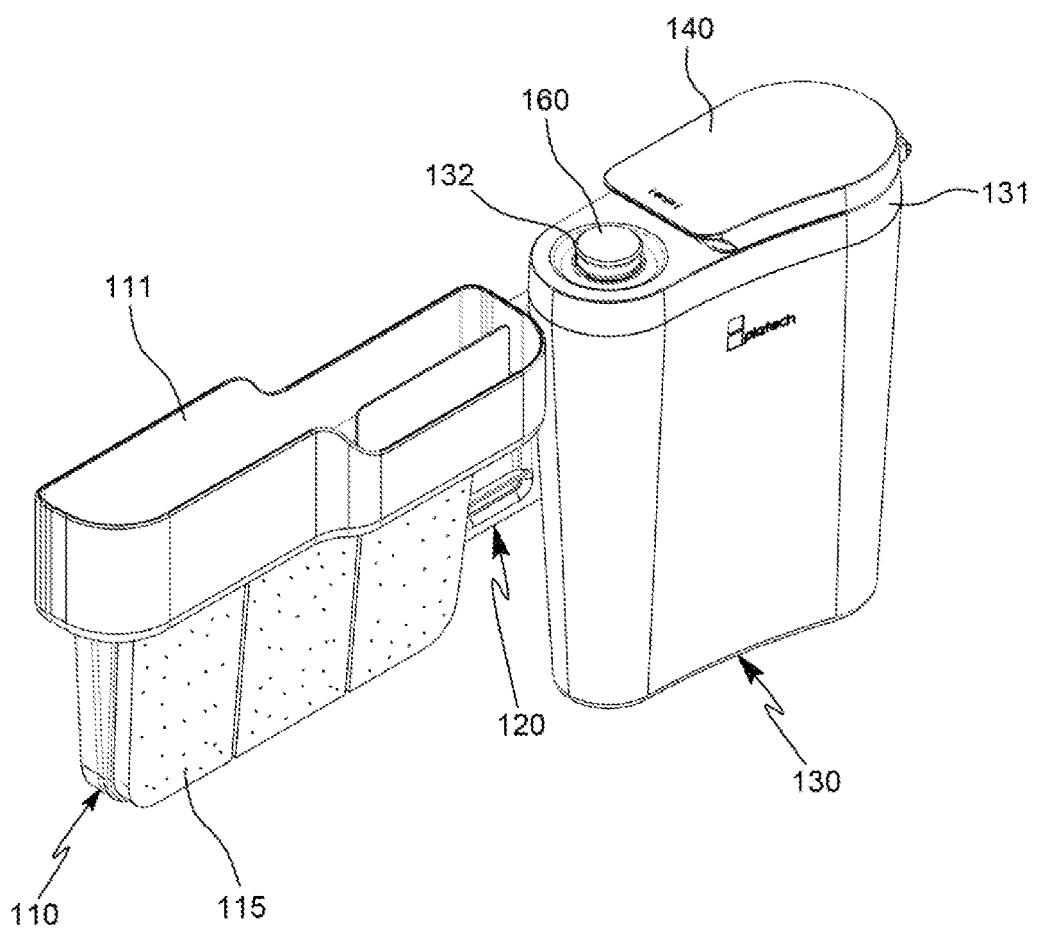
Figure 3:
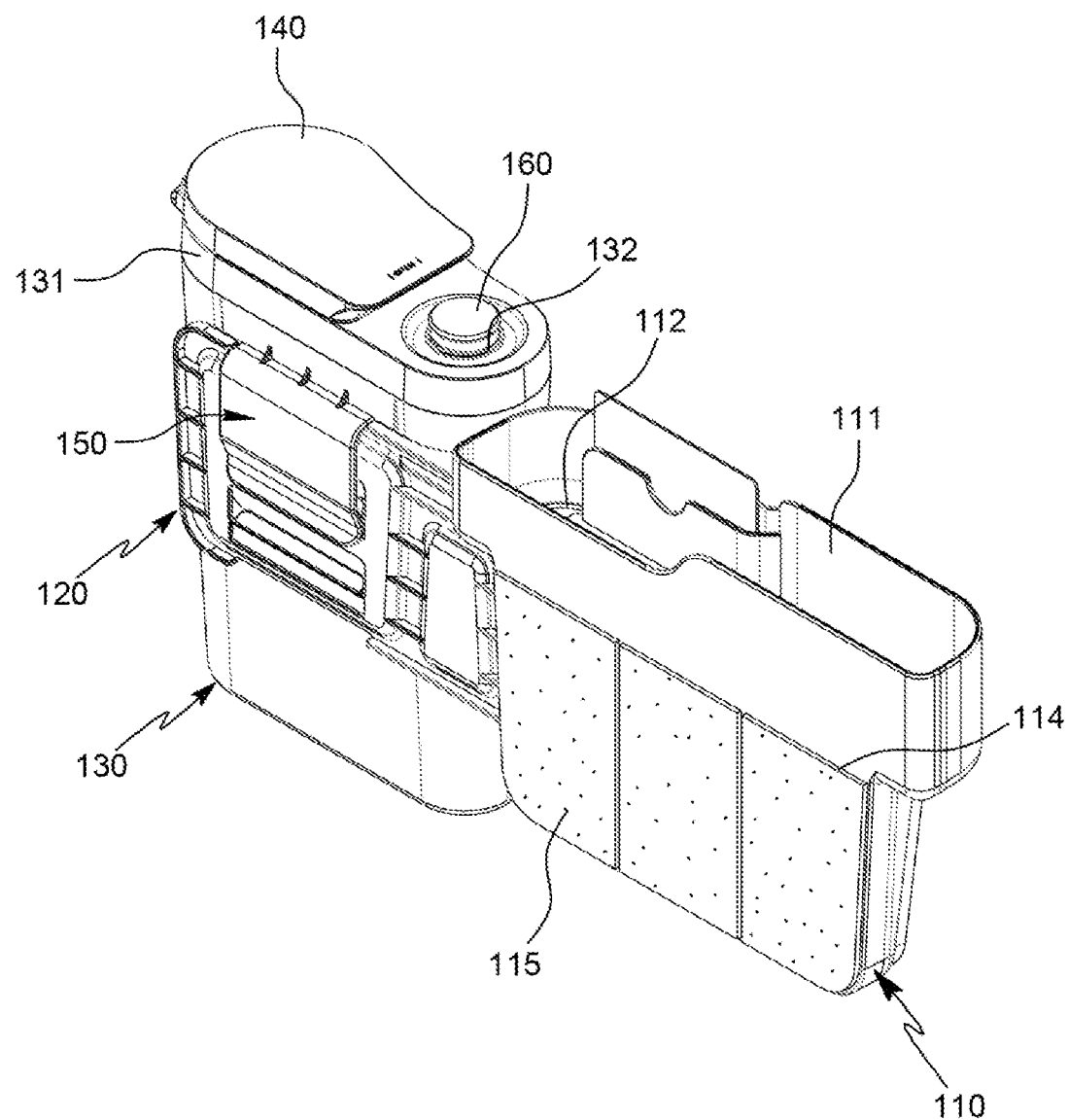
FIG. 3 is a rear perspective view showing the rear assembly structure of the car trash can according to the first embodiment of the present invention.

FIG. 1A and FIG. 1B are plan views respectively showing a car trash can according to a first embodiment of the present invention, in which FIG. 1A shows a type in which an article storage part is not provided and FIG. 1B shows a type in which an article storage part is provided between a center console and a front seat, FIG. 2A and FIG. 2B are front perspective views respectively showing the overall structures of the car trash cans of the type without the article storage part and the type with the article storage part according to the first embodiment of the present invention, and FIG. 3 is a rear perspective view showing the rear assembly structure of the car trash can according to the first embodiment of the present invention.

Referring to FIG. 1A to FIG. 3, a car trash can according to the present invention includes a fitting part 110, a mounting bracket 120, and a trash storage box 130.

The fitting part 110 is formed in a thin plate shape to fit into a gap between a front seat 20 and a center console 10 and has a thickness width that gradually narrows from top to bottom, so that the fitting part 110 can be easily fitted into the gap between the front seat 20 and the center console 10.

The mounting bracket 120 is formed to protrude a predetermined length from one side surface of the fitting part 110 toward the front and is provided with a holding part 121 of which strength is reinforced by a plurality of support ribs provided on the rear surface of the holding part 121.

The trash storage box 130 is provided with a hinge-type cover 140 installed on an opening part of the upper surface thereof, so that when the cover 140 is opened, trash can be put in through the opening part. The trash storage box 130 has a holding means 150, which is provided on the rear surface thereof so as to be attached to the holding part 121. Therefore, the trash storage box 130 is detachably mounted on the holding part 121 of the mounting bracket 120.

Figure 4:
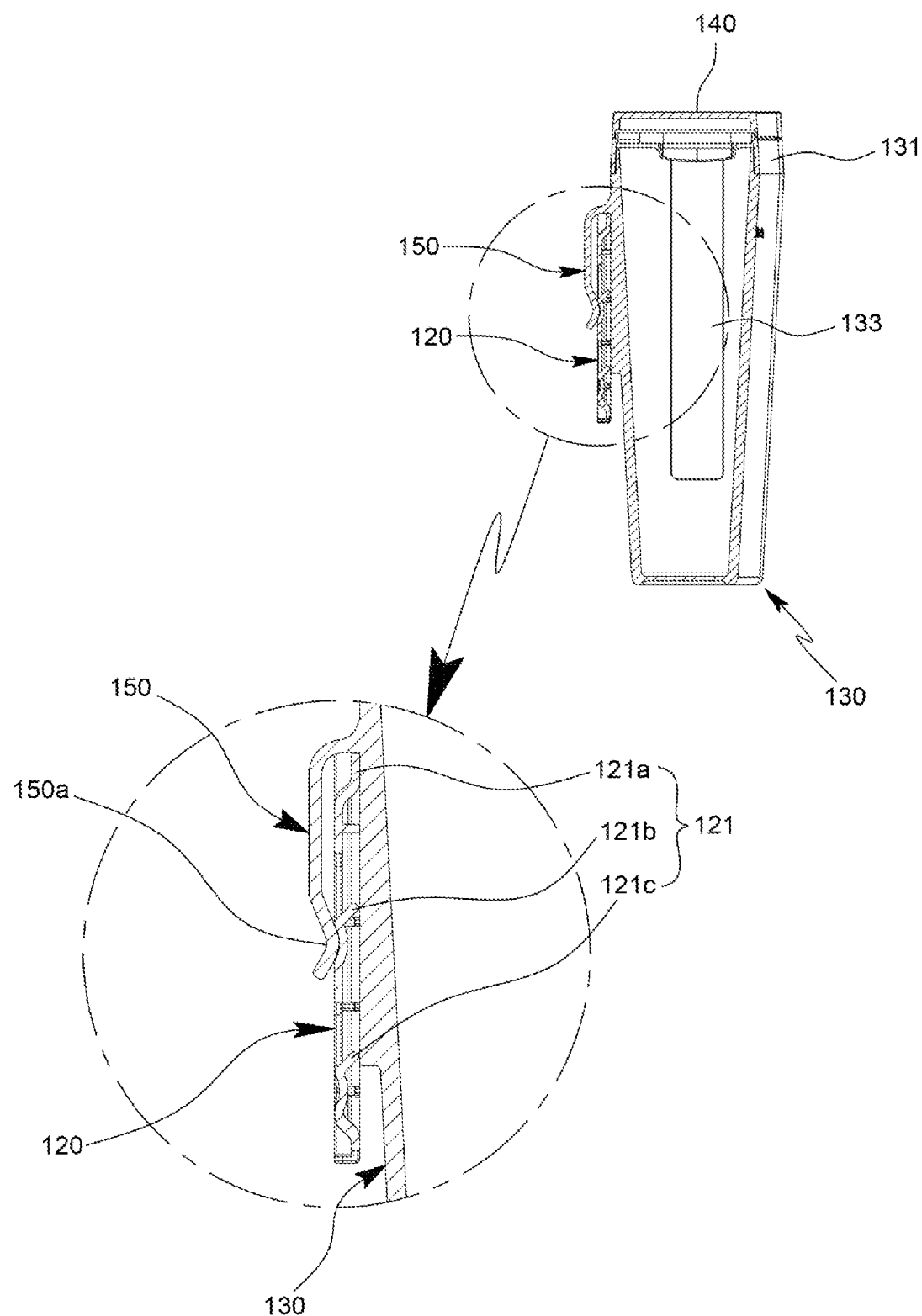
FIG. 4 is a partially enlarged cross-sectional view showing a structure in which a trash storage box of the present invention is held on a mounting bracket in multiple stages.

FIG. 4 is a partially enlarged cross-sectional view showing a structure in which the trash storage box of the present invention is held on the mounting bracket in multiple stages.

As shown in FIG. 4, preferably, the holding part 121 of the mounting bracket 120 is formed of the holding part 121 or a female-Velcro part, wherein the holding part 121 includes first, second and third holding parts 121a, 121b, 121c which are formed in two or three stages in the vertical direction. In addition, the holding means 150 of the trash storage box 130 is formed of a hook 150a or a male-velcro part corresponding to the holding part 121 or the female-Velcro part so as to be attached thereto.

Then, the vertical height of the trash storage box 130 can be adjusted to a position at a first stage or a second stage or a third stage, so that the vertical height of the trash storage box 130 can be easily adjusted in use according to the physical conditions of a seat occupant or the structure of a vehicle.

In the present invention described above, it is preferable that the trash storage box 130 is separately provided with an upper frame 131 in the upper opening portion of the trash storage box 130 in a prefabricated manner, wherein the upper frame 131 has an opening which is formed at one side of the upper surface portion of the upper frame 131 so as to be opened or closed by the hinge-type cover 140 and a storage part 133 which is formed at the other side of the upper surface portion of the upper frame 131 and has a storage hole 132 so as to accommodate writing instruments or a cleaning brush 160 through the storage hole 132.

Then, since the storage part 133 is in a separately isolated state at one side in the trash storage box 130, even if moisture or dirty garbage is put into the inside of the trash storage box 130, there is no risk of contamination of the writing instruments or the cleaning brush 160 stored the storage part 133.

In addition, since a small hole is provided in the bottom of the storage part 133, even if water flows into the storage hole 132, it flows out to the inside the trash storage box 130 through the small hole, so that the inside of the storage part 133 can be maintained in a clean and dry condition at all times.

Herein, the upper surface of the fitting part 110 may be provided with an article storage part 111 having a storage space with a predetermined width so as to accommodate items such as a mobile phone and a charging cable. The article storage part 111 may protrude at a certain height beyond the upper portion of the front seat 20 when the fitting part 110 is inserted between the front seat 20 and the center console 10, so that it is easy for a driver to use the article storage part 111 while driving.

Since a charging cable hole 112 through which a charging cable passes is formed in the bottom of the article storage part 111, in addition to storing items such as a mobile phone and a charging cable in the article storage part 111, the mobile phone accommodated in the article storage part 111 can be charged with the charging cable by connecting the charging cable to a cigar jack through the hole 112.

Figure 5A:
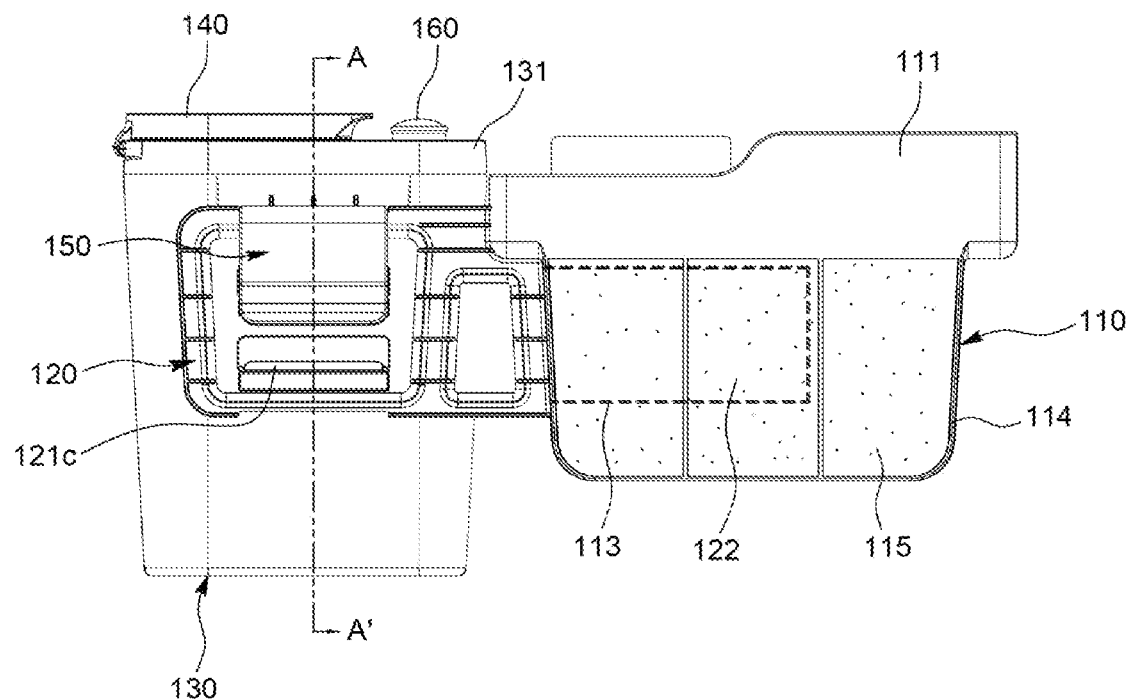
FIG. 5A and FIG. 5B are rear views respectively showing states in which the trash storage box is changed in position by an insertion type mounting bracket according to the first embodiment of the present invention.
Figure 5B:
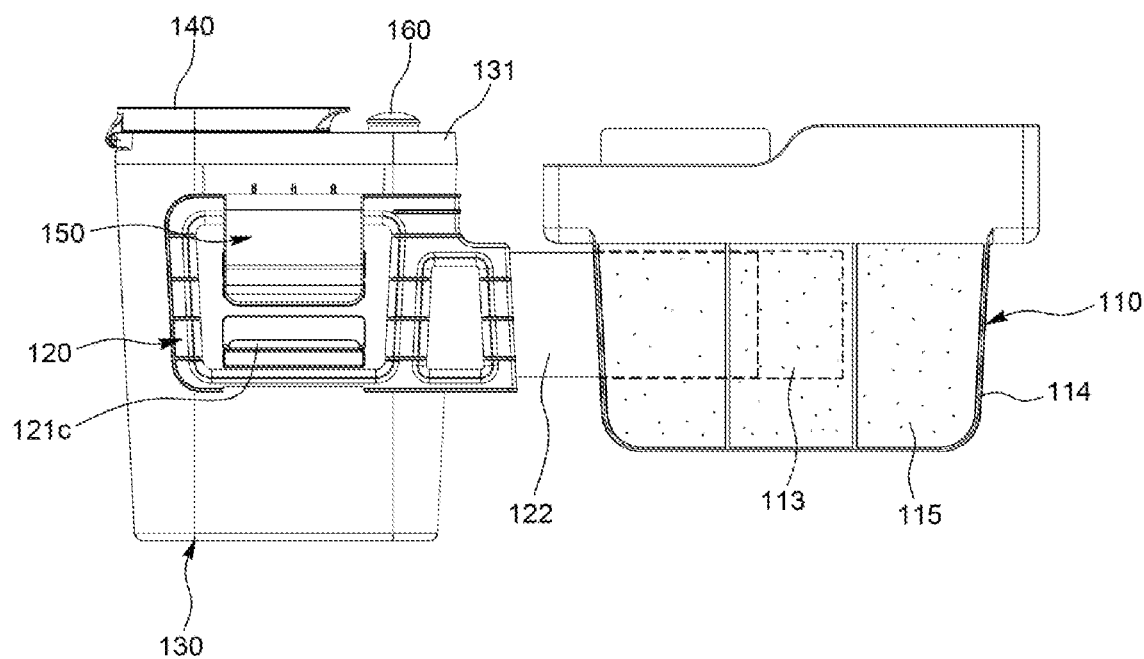

FIG. 5A and FIG. 5B are rear views respectively showing states in which the trash storage box is changed in position by an insertion type mounting bracket in the present invention.

As shown in FIG. 5A and FIG. 5B, a bracket hole 113 may be provided in one side of the fitting part 110, and the mounting bracket 120 may include a support part 122, which is formed with a predetermined length at the rear portion of the mounting bracket 120 so as to enter or exit the fitting part 110 through the bracket hole 113.

At this time, it is preferable that the support part 122 is provided with a concave-convex groove on one side so that the access of the support part 122 can be controlled in multiple stages and a stepped portion is provided at one side of the bracket hole 113 so as to be elastically held by the concave-convex groove of the support part 122 so that entry/exit operations can be controlled in multiple stages.

Then, the protruding length of the mounting bracket 120 from the fitting part 110 can be adjusted in multiple stages by the support part 122. Therefore, there is convenience in that the position of the trash storage box 130 mounted on the mounting bracket 120 can be adjusted back and forth according to the body conditions of a seat occupant or the structure of the vehicle, so that the trash storage box 130 does not interfere with the thigh or knee of the seat occupant.

In this invention, it is preferable that the fitting part 110 is formed so that the thickness width gradually narrows from top to bottom, a plurality of recessed parts 114 of a predetermined depth are formed on one side in contact with the center console 10 or both sides, compression members 115 that are pressed elastically like a compression sponge are inserted in the respective recessed parts 114 so that the surfaces of the compression members 115 slightly protrude by 1-2 mm.

Then, when inserting the fitting part 110 into the gap between the front seat 20 and the center console 10, the fitting part 110 can be easily inserted due to the thickness that becomes gradually narrows from top to bottom. At this time, while the fitting part 110 is inserted, the slightly protruding surfaces of the compression members 115 fitted into the recessed parts 114 on one side or both sides are pressed. Therefore, the fitting part 110 can be more tightly fitted between the front seat 20 and the center console 10 so that the mounting state of the trash storage box 130 can be maintained very firmly.

In addition, as shown in FIG. 1 and FIG. 2, it is preferable that the article storage part 111 is formed in such a manner that the width of the front portion in which the cable hole 112 is formed is larger than the width of the rear portion, and the trash storage box 130 is formed in such a manner that a portion in which the storage hole 132 is formed protrudes more than the article storage part 111 and becomes gradually larger toward the front of the cover 140, on which the hinge of the cover 140 is provided.

Then, when a person sits in the front seat 20, his thigh or knee is prevented from interfering with the article storage part 111 and trash storage box 130 as much as possible, so that the space in front of the front seat 20 can be used as efficiently as possible.

Embodiment 2

Figure 6:
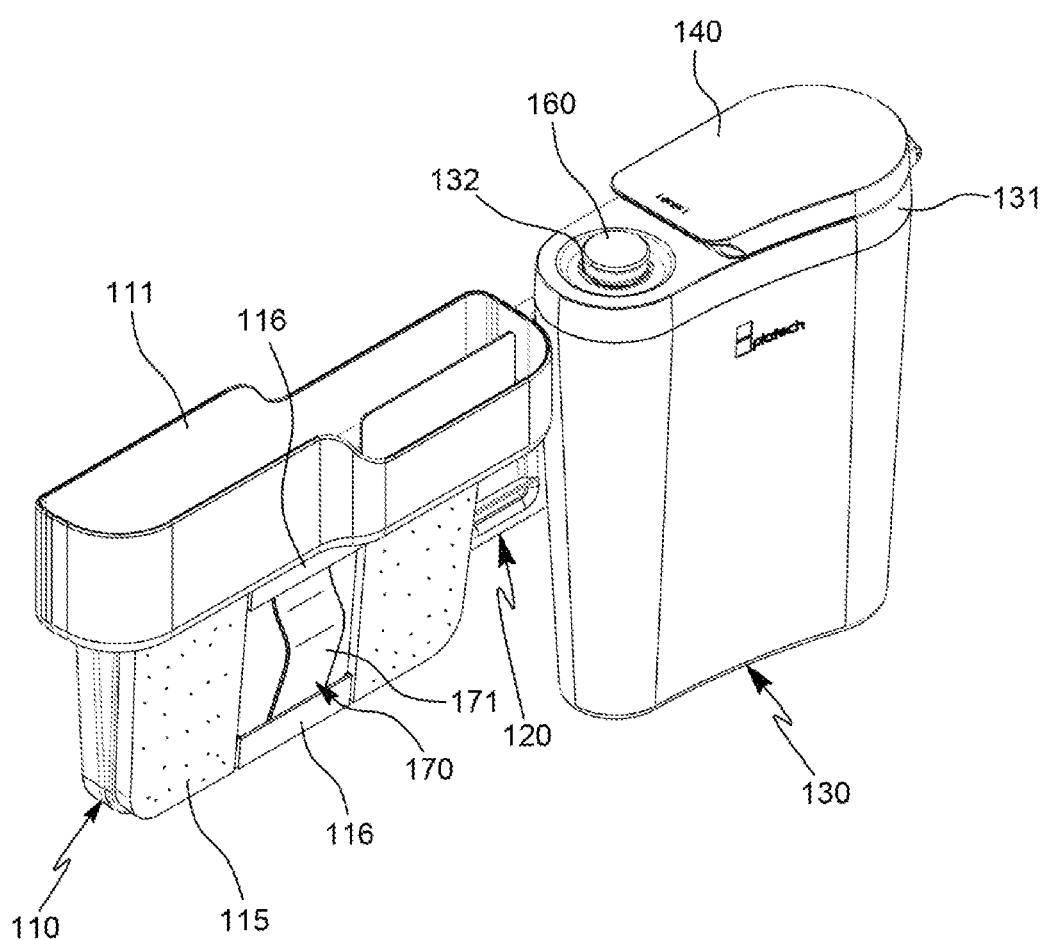
FIG. 6 is a front perspective view showing the overall structure of a car trash can according to a second embodiment of the present invention.
Figure 7:
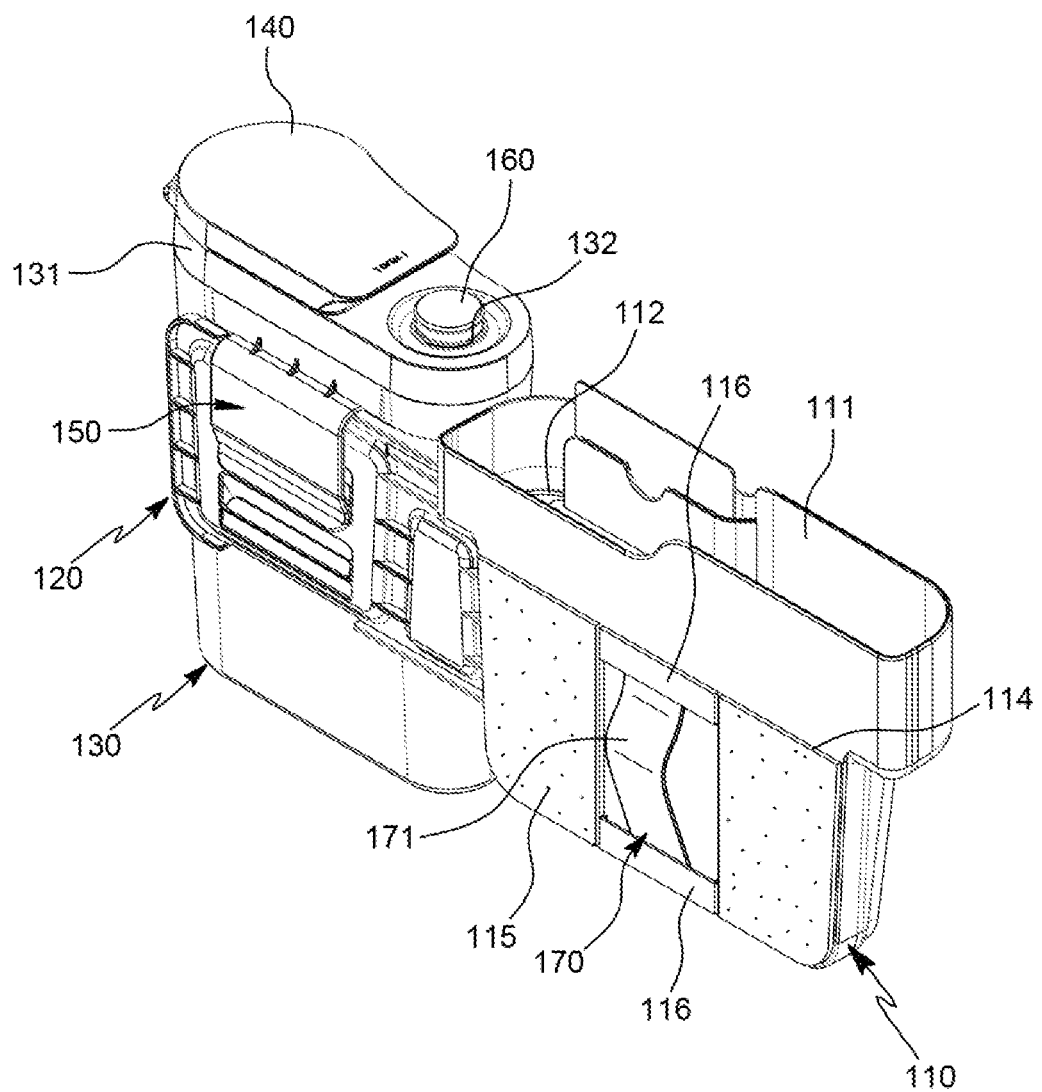
FIG. 7 is a rear perspective view showing the assembly structure of the rear side of the car trash can according to the second embodiment of the present invention.
Figure 8:
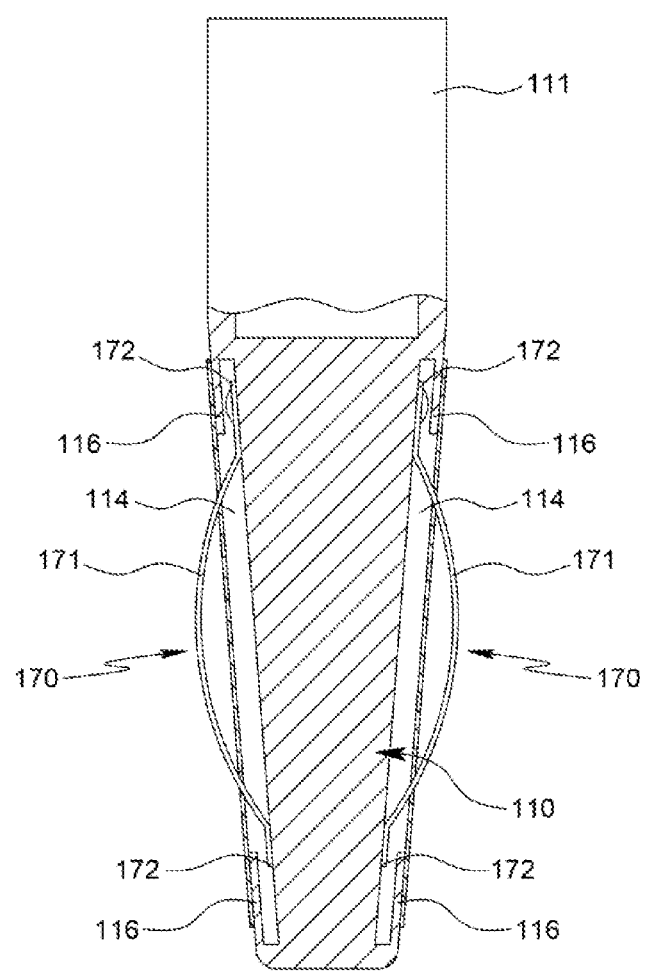
FIG. 8 is a cross-sectional view showing the structure of a fitting part provided with an elastic means according to the second embodiment of the present invention.

FIG. 6 is a front perspective view showing the overall structure of a car trash can according to the present invention, FIG. 7 is a rear perspective view showing the assembly structure of the rear side of the car trash can according to the present invention, and FIG. 8 is a cross-sectional view showing the structure of a fitting part provided with an elastic means according to the present invention.

Referring to FIG. 6 to FIG. 8, a car trash can according to the present invention includes a fitting part 110, a mounting bracket 120, a trash storage box 130 and an elastic means 170.

The fitting part 110 is formed in a thin plate shape to fit into a gap between a front seat 20 and a center console 10 and has a thickness width that gradually narrows from top to bottom, so that the fitting part 110 can be easily fitted into the gap between the seat 20 and the center console 10. In addition, the fitting part 110 is provided with recessed parts 114 on one side or both sides.

The mounting bracket 120 is formed to protrude a predetermined length from one side surface of the fitting part 110 toward the front and is provided with a plurality of holding parts 121 in the vertical direction, wherein a plurality of support ribs are provided on the rear surfaces of the holding parts 121 so as to reinforce the strength of the holding parts 121.

The trash storage box 130 is provided with a hinge-type cover 140 that opens or closes the opening part of an upper frame 131 assembled on top of the trash storage box 130, so that when the cover 140 is opened, trash can be put in through the opening part. A holding means 150 is provided on the rear surface of the trash storage box 130 and held on a selected one of the plurality of holding parts 121 so that the installation height of the trash storage box 130 is adjusted and the trash storage box 130 is coupled to the mounting bracket 120.

The elastic means 170 is installed on one or more of the recessed parts 114 of either one side or both sides of the fitting part 110, and is elastically pressed when the fitting part 110 is inserted between the seat 20 and the center console 10, thereby keeping the fit condition firmly, wherein since the elastic means 170 has elasticity, it is restored to its original position when the fitting part 110 is pulled out.

In addition, as shown in FIG. 4, the height of the trash storage box 130 can be adjusted in several stages in the vertical direction by selecting one of the first, second and third holding parts 121a, 121b, 121c of the mounting bracket 120 and coupling the holding means 150 provided on the rear side of the trash storage box 130 to the selected one. Therefore, there is an advantage that the height of the trash storage box 130 can be adjusted according to the body conditions of a seat occupant or the structure of a vehicle.

FIG. 4 shows that the holding part 121 of the mounting bracket 120 is formed in the multi-stage shape having the first, second and third holding part 121a, 121b, 121c and the holding means 150 is formed in the shape of the hook 150a, but the holding part 121 of the mounting bracket 120 and the holding means 150 can be formed of female and male Velcro elements corresponding to each other.

Meanwhile, it is possible to store a mobile phone and a charging cable so as to charge the mobile phone with the charging cable in the article storage part 111 that protrudes a certain height above the upper part of the seat 20.

The recessed part 114 may be divided into a plurality of recessed part 114 sections partitioned from each other and provided on one side or both sides of the fitting part 110, wherein one of the recessed part 114 sections may be provided with the elastic means 170 and the remaining recessed part 114 sections may be provided with the compression members 115 of which surfaces partially protrude so as to be pressed elastically.

Then, when the fitting part 110 is inserted into the gap between the seat and the center console, the surfaces of the elastic means 170 and the compression members 115 are pressed together so that the fitting part 110 is inserted with strong pressure. Therefore, the fitting part 110 is kept very tight in the gap between the seat and the center console.

Herein, it is preferable that the elastic means 170 is formed of a plate spring with a curved portion 171 protruding outward in the center, as shown in FIG. 8, and that release prevention parts 116 are provided at the upper and lower portions of the recessed part 114 where the elastic means 170 is installed so that the both ends 172 of the leaf spring that is the elastic means 170 are fitted into the release prevention parts 116.

Then, while the curved portion 171 of the elastic means 170 made of the leaf spring is pressed, the fitting part 110 is maintained in the state of being firmly fitted into the gap between the seat and the center console, wherein when the elastic means 170 is compressed, the upper and lower ends of the elastic means 170 are well supported in the release prevention parts 116, so there is no fear that the elastic means 170 made of the leaf spring is separated from the recessed part 114.

Herein, either the upper or lower portion of the elastic means 170 may be fixed with a fastening means such as a screw. In this case, the release prevention part 116 is provided with a space so that the other portion of the elastic means 170 which is not fixed can be sufficiently stretched.

Figure 9A:
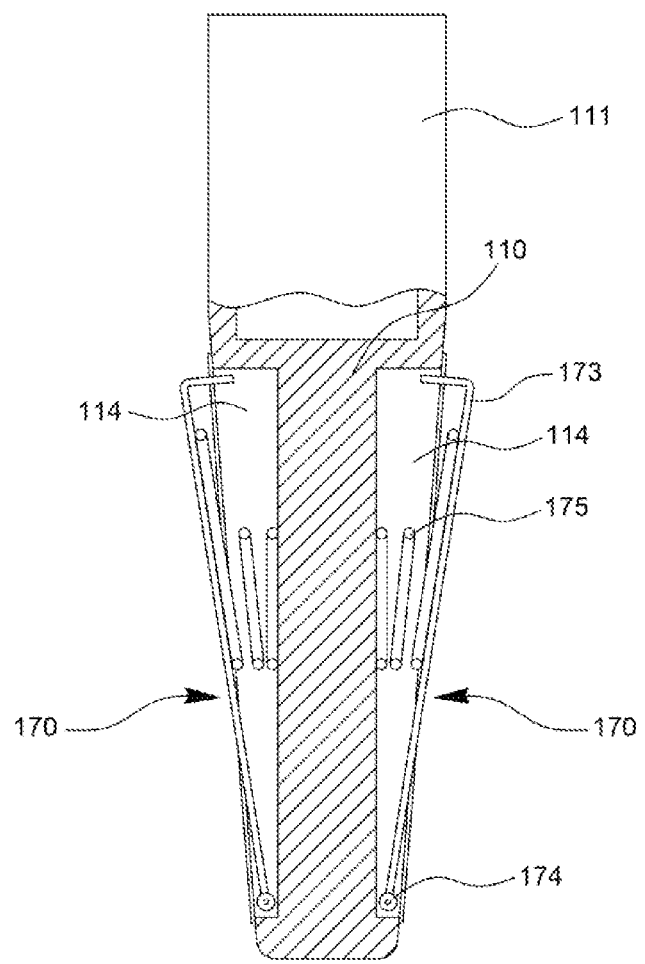
FIG. 9A and FIG. 9B are cross-sectional views respectively showing elastic means according to further embodiments of the present invention.
Figure 9B:
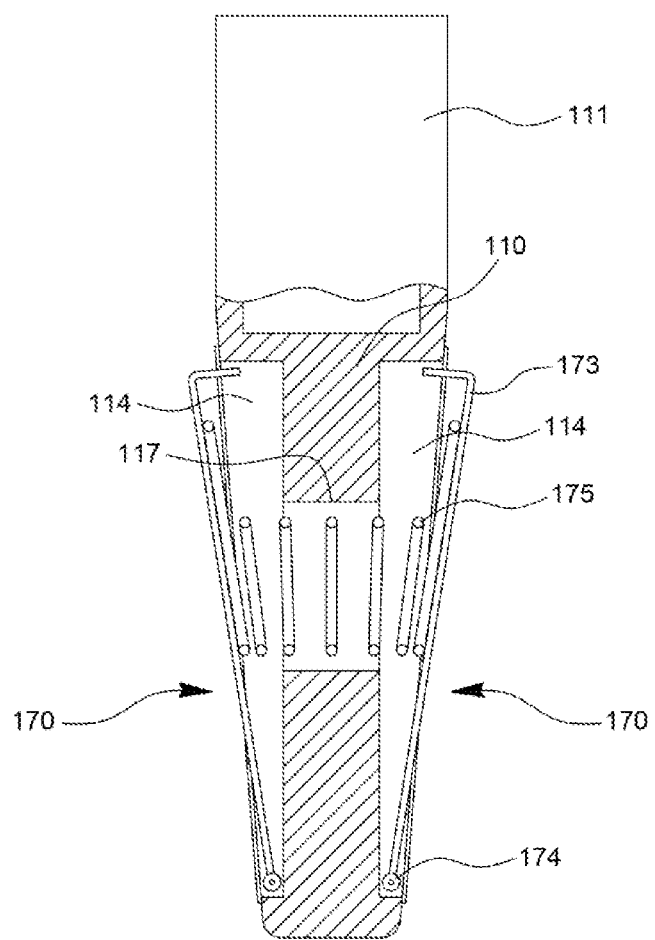

FIG. 9A and FIG. 9B are cross-sectional views respectively showing elastic means according to further embodiments of the present invention.

That is, as shown in FIG. 9A, an elastic means 170 provided on one side or both sides of the fitting part 110 may include a support plate 173, which is installed so that a hinge part 174 is coupled to the lower end of the recessed part 114 by a hinge pin, and a coil spring 175, which is installed between the support plate 173 and the fitting part 110 so as to maintain a state, in which the upper end of the support plate 173 that is hinge-coupled is elastically spread.

In this configuration, when inserting the fitting part 110 into the gap between the seat and the center console, the insertion state of the fitting part 110 can be maintained very firmly by the support force of the support plate 173 that presses the coil spring 175.

Herein, in the case where the support plates 173 constituting the elastic means 170 are installed on both sides of the fitting part 110 as shown in FIG. 9B, a through-hole 117 may be formed in the fitting part 110 where the support plates 173 are installed, wherein the through-hole 117 has a predetermined size so that a single coil spring 175 is inserted into the through-hole 117. Therefore, the both ends of a single coil spring 175 may be installed through the through-hole 117 so as to support both support plates 173.

Then, stronger elasticity can be applied by the single coil spring 175 to the both support plates 173 oppositely installed on both sides of the fitting part 110, thereby securing more robust installation state of the fitting part 110 inserted into the gap between the seat and the center console.

Figure 10A:
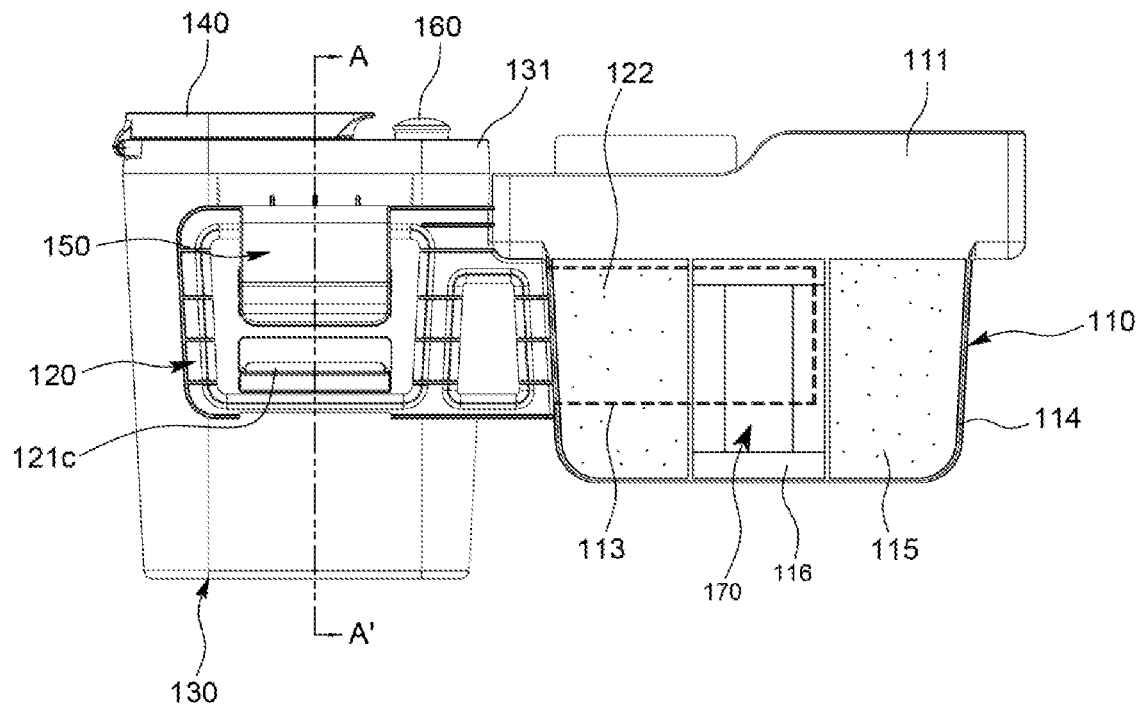
FIG. 10A and FIG. 10B are rear views respectively showing states in which the trash storage box is changed in position by the insertion type mounting bracket according to the second embodiment of the present invention.
Figure 10B:
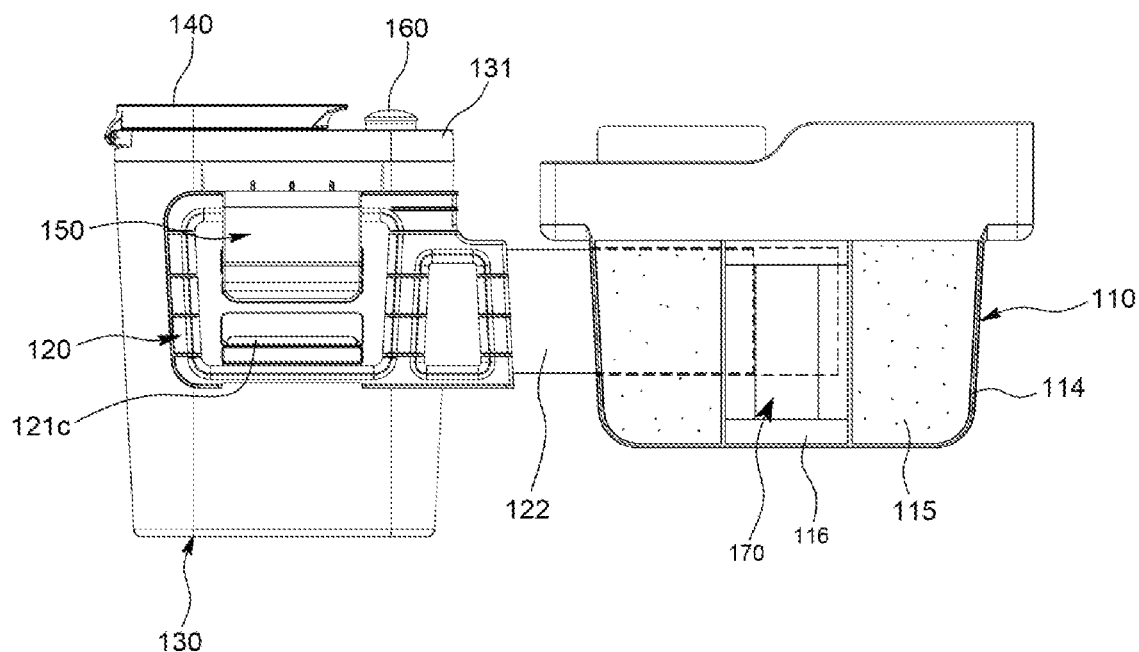

FIG. 10A and FIG. 10B are rear views respectively showing states in which the trash storage box is changed in position by the insertion type mounting bracket according to the second embodiment of the present invention.

As shown in FIG. 10A and FIG. 10B, the fitting part 110 may have the bracket hole 113 in one side surface, and the mounting bracket 120 may have the support part 122 of the predetermined length at the rear portion thereof so that the support part 122 enters or exits the fitting part 110 through the bracket hole 113.

In addition, if the support part 122 is provided with the concave-convex groove on one side so that the access of the support part 122 can be controlled in multiple stages and the stepped portion is provided at one side of the bracket hole 113 so as to be elastically held by the concave-convex groove formed on one side of the support part 122, the entry and exit operations can be preferably controlled in multiple stages Then, the protruding length of the mounting bracket 120 from the fitting part 110 can be adjusted in multiple stages by the support part 122.

Therefore, there is convenience in that the position of the trash storage box 130 mounted on the mounting bracket 120 can be adjusted back and forth according to the body conditions of a seat occupant or the structure of the vehicle, so that the trash storage box 130 does not interfere with the thigh or knee of the seat occupant.

Although the invention created by the present inventor has been described in detail according to the above embodiments, it will be apparent to those skilled in the art that the present invention is not limited to the above embodiments and various changes and modifications can be made without departing from the gist of the present invention.

- Explanation of Reference Numerals -

| | |
|---|---|
| 10: center console | 20: seat |
| 110: fitting part | 111: article storage part |
| 112: charging cable hole | 113: bracket hole |
| 114: recessed part | 115: compression member |
| 116: release prevention part | 117: through-hole |
| 120: mounting bracket | 121: holding part |
| 121a, 121b, 121c: first, second and third holding parts | |
| 122: support part | |
| 130: trash storage box | 131: upper frame |
| 132: storage hole | 133: storage part |
| 140: cover | 150: holding means |
| 160: cleaning brush | 170: elastic means |
| 171: curved portion | 172: both ends |
| 173: support plate | 174: hinge part |
| 175: coil spring | |

What is claimed is:

1. A car trash can, comprising:
a fitting part fitted into a gap between a front seat and a center console;
a mounting bracket having a holding part provided at a front end protruding from one side surface of the fitting part toward the front; and
a trash storage box detachably attached to the holding part of the mounting bracket with a holding means, which is provided on a rear surface of the trash storage box and held by the holding part,
wherein the mounting bracket is provided with a plurality of holding parts, so that the mounting height of the trash storage box can be adjusted fixing the holding means of the trash storage box to a selected one of the plurality of holding parts, and
wherein the trash storage box can be used for multiple purposes with a self-assembly type upper frame provided in an upper opening portion of the trash storage box, wherein the upper frame has an opening which is formed at one side of the upper surface portion of the upper frame so as to be opened or closed by a hinge-type cover and a storage part which is formed at the other side of the upper surface portion of the upper frame and has a storage hole so as to accommodate writing instruments or a cleaning brush through the storage hole.

2. The car trash can according to claim 1, wherein the holding part of the mounting bracket is formed of first, second and third holding parts formed in two or three stages in the vertical direction, or a female-Velcro part, and the holding means of the trash storage box is formed of a hook or a male-Velcro part to be attached to the holding part or the female-Velcro part, so that the vertical height of the trash storage box can be adjusted according to the physical conditions of a seat occupant or the structure of a vehicle.

3. The car trash can according to claim 2, wherein the fitting part is formed to be gradually narrower in thickness from top to bottom and has a plurality of recessed parts on one side that comes into contact with the center console, or both sides, and an elastic compression member is provided protruding by 1 to 2 mm on each of the recessed parts, so that the fitting part is tightly fitted into the gap between a front passenger seat and the center console.

4. The car trash can according to claim 1, wherein the fitting part is provided with a bracket hole on one side, and the mounting bracket is provided with a support part at a rear portion that enters or exits the bracket hole, so that the position of the trash storage box can be adjusted in the back and forth direction according to the physical conditions of a seat occupant or the structure of a vehicle.

5. The car trash can according to claim 1, wherein the fitting part is formed to be gradually narrower in thickness from top to bottom and has a plurality of recessed parts on one side that comes into contact with the center console, or both sides, and an elastic compression member is provided protruding by 1 to 2 mm on each of the recessed parts, so that the fitting part is tightly fitted into the gap between a front passenger seat and the center console.

6. The car trash can according to claim 1, wherein the fitting part is formed to be gradually narrower in thickness from top to bottom and has a plurality of recessed parts on one side that comes into contact with the center console, or both sides, and an elastic compression member is provided protruding by 1 to 2 mm on each of the recessed parts, so that the fitting part is tightly fitted into the gap between a front passenger seat and the center console.

7. A car trash can, comprising:
a fitting part fitted into a gap between a front seat and a center console;
a mounting bracket having a holding part provided at a front end protruding from one side surface of the fitting part toward the front; and
a trash storage box detachably attached to the holding pan of the mounting bracket with a holding means, which is provided on a rear surface of the trash storage box and held by the holding part,
wherein the mounting bracket is provided with a plurality of holding parts, so that the mounting height of the trash storage box can be adjusted fixing the holding means of the trash storage box to a selected one of the plurality of holding parts, and
wherein the fitting part includes an article storage part, which is provided in the upper portion of the fitting part and has a storage space for articles, and a charging cable hole is formed in the bottom of the article storage part so that articles storage and cell phone charging can be performed at the same time.

8. The car trash can according to claim 7, wherein the holding part of the mounting bracket is formed of first, second and third holding parts formed in two or three stages in the vertical direction, or a female-Velcro part, and the holding means of the trash storage box is formed of a hook or a male-Velcro part to be attached to the holding part or the female-Velcro part, so that the vertical height of the trash storage box can be adjusted according to the physical conditions of a seat occupant or the structure of a vehicle.

9. The car trash can according to claim 7, wherein the fitting part is provided with a bracket hole on one side, and the mounting bracket is provided with a support part at a rear portion that enters or exits the bracket hole, so that the position of the trash storage box can be adjusted in the back and forth direction according to the physical conditions of a seat occupant or the structure of a vehicle.

10. The car trash can according to claim 7, wherein the fitting part is formed to be gradually narrower in thickness from top to bottom and has a plurality of recessed parts on one side that comes into contact with the center console, or both sides, and an elastic compression member is provided protruding by 1 to 2 mm on each of the recessed parts, so that the fitting part is tightly fitted into the gap between a front passenger seat and the center console.

11. A car trash can, comprising:
a fitting part fitted into a gap between a front seat and a center console and provided with a recessed part on one side surface or both side surfaces;
a mounting bracket protruding from one side surface of the fitting part and having a plurality of holding parts;
a trash storage box, of which mounting height is adjusted by selectively fixing a holding means that is provided on the rear surface of the trash storage box to one of the plurality of holding parts provided on the mounting bracket; and
an elastic means installed on the recessed part on either one side surface or both side surfaces of the fitting part so as to be elastically pressed when inserting the fitting part between a seat and a center console or to be restored to an original position when withdrawing the fitting part, so that the car trash can is firmly fitted and provided between the seat and the center console.

12. The car trash can according to claim 11, wherein the recessed part is provided with a plurality of recessed part sections on one side or both sides of the fitting part, one or more of the recessed part sections are provided with elastic means, and the remaining recessed part sections are provided with compression members that partially protrude so as to be pressed elastically, so that the fitting part fits firmly into the gap between the seat and the center console.

13. The car trash can according to claim 12, wherein the elastic means is formed of a leaf spring that has a curved portion formed in the center protruding outward, and both ends of the leaf spring that is the elastic means are fitted into release prevention parts formed on the upper and lower portions of the recessed part on which the elastic means is installed, so that the release prevention parts prevent the release of the leaf spring, thereby firmly maintaining the installation state of the fitting part.

14. The car trash can according to claim 12, wherein in order to firmly maintain the installation state of the fitting part, the elastic means provided on one side or both sides of the fitting part includes: a support plate installed so that a hinge part is coupled to the lower end of the recessed part by a hinge pin; and a coil spring installed between the support plate and the fitting part so as to maintain a state, in which the upper end of the support plate that is hinge-coupled is elastically spread.

15. The car trash can according to claim 14, wherein when the elastic means are respectively installed on both side surfaces of the fitting part, a through-hole is provided in the fitting part, on which the recessed part is positioned and the support plate is provided, and the coil spring is inserted into the through-hole, so that each support plate on both sides of the fitting part receives elasticity by the coil spring.

16. The car trash can according to claim 11, wherein the elastic means is formed of a leaf spring that has a curved portion formed in the center protruding outward, and both ends of the leaf spring that is the elastic means are fitted into release prevention parts formed on the upper and lower portions of the recessed part on which the elastic means is installed, so that the release prevention parts prevent the release of the leaf spring, thereby firmly maintaining the installation state of the fitting part.

17. The car trash can according to claim 11, wherein in order to firmly maintain the installation state of the fitting part, the elastic means provided on one side or both sides of the fitting part includes: a support plate installed so that a hinge part is coupled to the lower end of the recessed part by a hinge pin; and a coil spring installed between the support plate and the fitting part so as to maintain a state, in which the upper end of the support plate that is hinge-coupled is elastically spread.

18. The car trash can according to claim 17, wherein when the elastic means are respectively installed on both side surfaces of the fitting part, a through-hole is provided in the fitting part, on which the recessed part is positioned and the support plate is provided, and the coil spring is inserted into the through-hole, so that each support plates on both sides of the fitting part receives elasticity by the coil spring.

\* \* \* \* \*